A. J. BENTZ.
SIGNAL LAMP FOR VEHICLES.
APPLICATION FILED FEB. 14, 1917.

1,240,115.

Patented Sept. 11, 1917.
2 SHEETS—SHEET 1.

Inventor
Addison J. Bentz
By Fisher & ——
Attorneys

A. J. BENTZ.
SIGNAL LAMP FOR VEHICLES.
APPLICATION FILED FEB. 14, 1917.
1,240,115.
Patented Sept. 11, 1917.
2 SHEETS—SHEET 2.
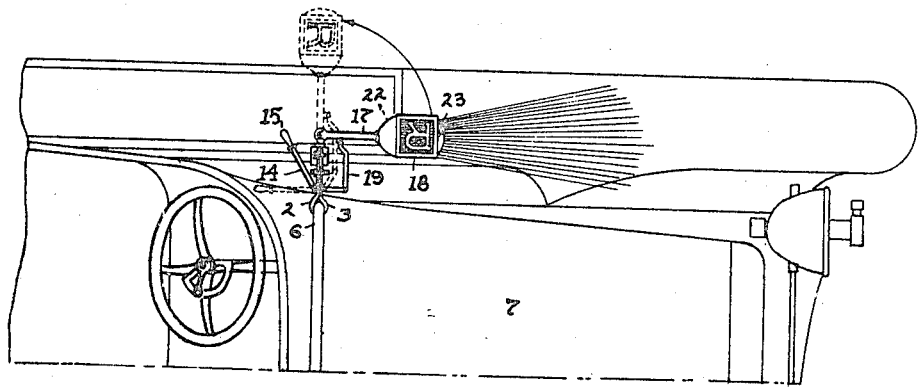
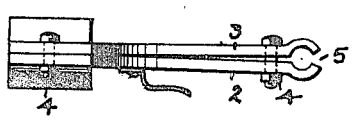
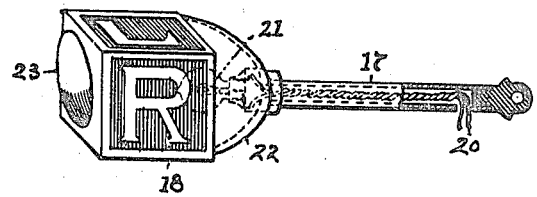
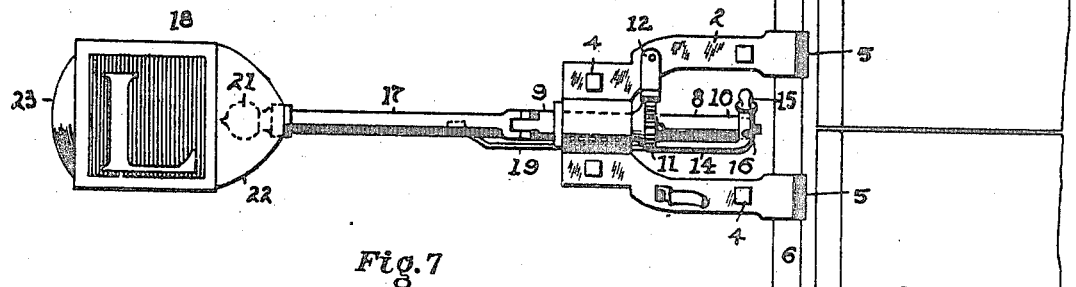
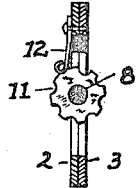
Witness
F. C. Harrold
Inventor
Addison J. Bentz
By Fisher & Wolet
Attorneys

UNITED STATES PATENT OFFICE.

ADDISON J. BENTZ, OF ASHLAND, OHIO.

SIGNAL-LAMP FOR VEHICLES.

1,240,115.  Specification of Letters Patent.  Patented Sept. 11, 1917.

Application filed February 14, 1917. Serial No. 148,682.

*To all whom it may concern:*

Be it known that I, ADDISON J. BENTZ, citizen of the United States, residing at Ashland, in the county of Ashland and State of Ohio, have invented certain new and useful Improvements in Signal-Lamps for Vehicles, of which the following is a specification.

This invention relates to a signaling device adapted to be controlled by the occupant of a vehicle, the invention consisting in the rotatable and foldable combination of parts substantially as herein described, whereby various signaling effects may be obtained and an illuminating light projected in various directions from a fixed place of attachment, and the invention is especially applicable to automobiles but not necessarily limited in use to that class of vehicles.

The device is designed to be attached to the vehicle wherever it may be conveniently operated and in the case of an automobile preferably on the wind shield frame at the front of the driver's seat, and the lamp is intended to rest in an upright position under normal conditions and to be turned down and outwardly at one side of the vehicle to indicate the intention of the driver in turning or stopping his own machine. The device also embodies means to turn the lamp on a horizontal axis when in the signaling position as described in order that different signals may be displayed in that position of parts, and a sweeping movement may be imparted to the lamp to project the light rays forwardly, downwardly or upwardly, either from the normal upright position of rest of the lamp, or from the horizontal signaling position described. In this way, the light may be used to attract attention or to illuminate objects on the ground, either at the side or front of the car.

Figure 1:
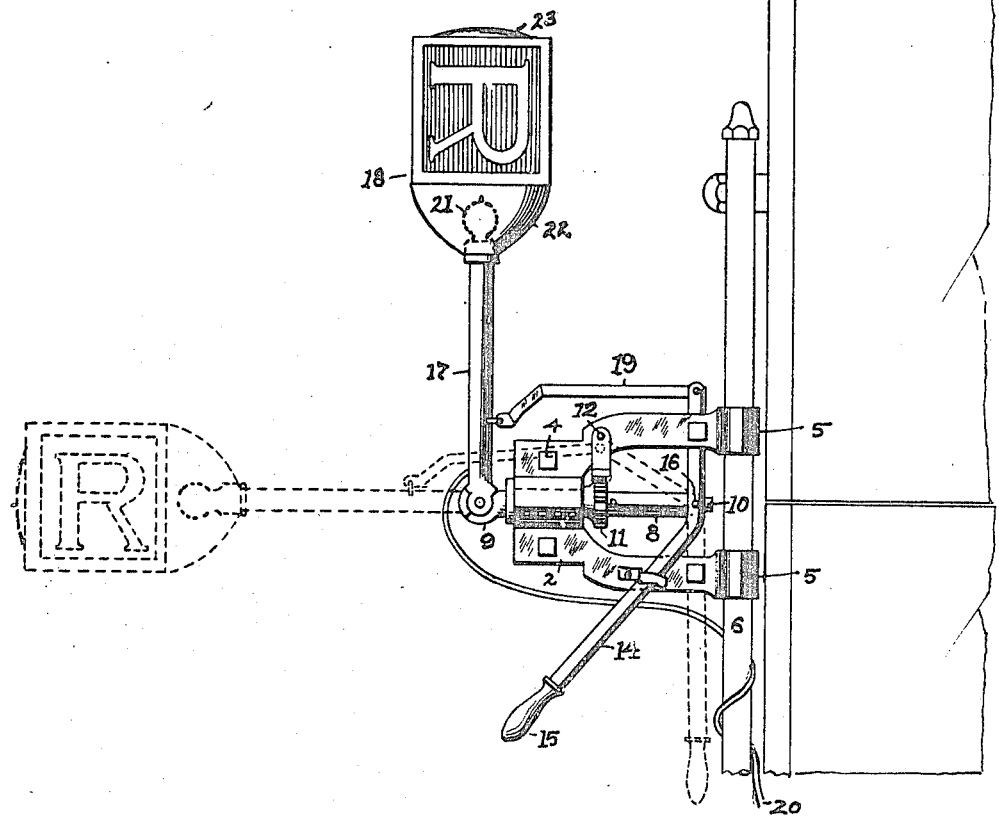
Figure 2:
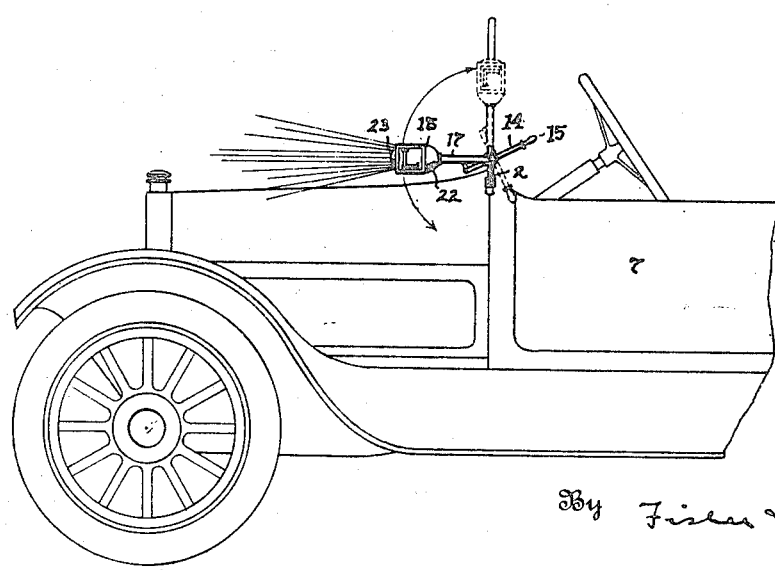

In the accompanying drawings, Figure 1 is a rear elevation of a portion of a wind shield showing my improved spot and signal lamp attached to the side standard, the dotted position of the parts showing one signaling position of the lamp. Fig. 2 is a side view of a portion of an automobile carrying my improved lamp, which is turned down to a horizontal position and pointed forwardly to project the light forwardly. Fig. 3 is a plan view of Fig. 2, but also showing the lamp in dotted lines as it appears in a signaling position. Fig. 4 is a perspective view of the lamp and its immediate supporting arm. Fig. 5 is a plan view of the lamp bracket alone. Fig. 6 is a view corresponding to Fig. 1, but showing the lamp in full lines in its horizontal signaling position and moreover rotated a quarter turn to display the letter "L" which indicates that the vehicle is about to turn to the "left". Fig. 7 is a detail of the controlling mechanism.

The invention comprises a bifurcated bracket made of two corresponding parts 2 and 3 respectively secured together by screws or bolts 4 and having clamping extremities 5 to hold the bracket upright upon the windshield standard 6 or its equivalent on the vehicle 7, and the outer end of each bracket part is formed to provide a bearing for a short shaft 8 having a pivot eye or hinge member 9 outside of the bracket and an operating extension 10 inside of the bracket arms. A ratchet wheel 11 fastened to shaft 8 adjacent its bearing in the bracket prevents end movement of the shaft, and a flat spring 12 affixed to the bracket (see Fig. 7) engages the periphery of the ratchet wheel and holds the shaft and parts carried thereby in any set position, but a pawl or equivalent locking means may be used in lieu of the spring. Rotation of the shaft is obtained by a bent lever 14 which is pivotally secured to the shaft extension 10 and has a handle 15 extending within convenient reach of the driver of the car. Thus, by imparting uplift or a downward movement to the lever the shaft will be rotated correspondingly, but not exceeding one hundred and eighty degrees, because the play of the lever is limited by the bracket arms. Lever 14 may also be turned on its pivot 16, and this movement and the rotative movement of the shaft, is utilized to fold and unfold the lamp arm 17 and to turn the lamp 18 into different lighting and signaling positions, the said arm 17 being hinged to the pivot eye 9 of the shaft and the bent end of lever 14 being pivotally connected to arm 17 by a link 19, see Fig. 1. Arm 17 is tubular to serve as a conduit for an electric wire 20 for the electric light 21 inclosed within the square casing comprising the lamp 18 and which includes four translucent sides bearing names, or more preferably, the letters "R" and "L" as abbreviations of the words "right" and "left", respectively. The inner end of the lamp casing is rounded or formed internally to provide a parabolic reflector 22, and the outer end is inclosed by a glass lens 23. The light rays are therefore projected by the reflector through the lens, and a diffused light is also obtained to illuminate the lettered sides. Consequently, when lever 14 is operated to turn the lamp arm from an upright position as shown in full lines in Fig. 1 to the horizontal position shown in dotted lines in said figure, the lamp 18 is projected at the side of the car with its front and rear lettered sides in visible and readable position, and assuming a turn to the right is to be taken, the letter "R" will appear without further operation. But if a turn to the left is the intent, then a further action is taken,—that of rotating the shaft 8 by uplift of lever 14 so that the other sides of the lamp bearing the letter "L" will be turned into view front and rear. The horizontal position of the arm alone serves as a signal in the same way as the outstretched arm of the driver now serves as a signal to meet the rules of the road, but the alternate display of the letters supplements and makes the intent clearer.

However, the device is not limited to the signaling use alone; it may be used also to flash a signal ahead, upwardly or in a sweeping circle, by turning lever 14 on its pivot and rotating shaft 8 as well. Thus, if lamp 18 is upright as in Fig. 1 it may be turned downwardly toward the front of the car as shown in full lines, Figs. 2 and 3, by merely raising lever 14 to rotate shaft 8, and where this movement is carried to its full limit the lamp will be turned to throw its light from lens 23 upon the ground. Moreover, by turning lever 14 on its pivot 16 the lamp may be turned from the forward position shown in full lines, Fig. 3, to the position shown in dotted lines; in fact, the double movement permits a wide range of sweeping lighting effects to be obtained, either for signaling or illuminating purposes.

What I claim is:

1. A signaling device, comprising a member having a rotatable shaft mounted thereon and a folding extension having a signal member carried thereby, and means to operate said shaft and extension jointly.

2. A signaling device, comprising a bracket having a rotatable shaft mounted thereon and a folding arm having a lamp carried thereby, and means to operate said shaft and arm jointly.

3. A signaling device, comprising a support, a rotatable member journaled upon said support, a signaling device having a supporting arm foldably mounted upon said member, and a lever to rotate said member having means extending to said arm to fold the same.

4. A signaling device, comprising a bracket, a rotatable shaft supported upon said bracket, a lamp having a supporting arm foldably mounted upon said shaft, and a lever to rotate said shaft having a connection with said arm to fold the same.

5. A signaling lamp, comprising a lamp and a horizontally-rotatable member having a hinged arm to support said lamp, and means to rotate said member and swing said arm into different positions.

6. A signaling lamp, comprising a clamping bracket having a rotatable shaft therein and means to hold said shaft in different rotatable positions, an arm hinged to said shaft having a lamp mounted thereon, and a lever pivoted to said shaft having a link connected with said arm.

7. A signaling lamp for vehicles, comprising a support having clamping means to secure it to a standard, a shaft carried by said support having a hinged extension, a lamp mounted upon said extension having translucent sides and a reflector therein to project light in a direction parallel with the axis of said extension, and means to actuate said shaft and extension into different positions relatively to each other and said support.

8. A spot and signal lamp, comprising a casing having translucent lettered sides and a lens at one end and a reflector opposite said lens, in combination with a jointed shaft and means to swing said lamp into either a horizontal or vertical position and to rotate the lamp on the main axis of said reflector and lens.

9. In a signal lamp, a clamping bracket having a pivotally jointed shaft rotatably mounted thereon, a lamp and a lever secured at opposite ends of said shaft, and a link connecting said lever and one of the jointed portions of said shaft.

10. In a signal lamp, a lamp having lettered sides and a rotatable shaft therefor having a hinged joint dividing said shaft into sections, and a lever pivoted to one of said shaft sections and having a link uniting it with the other section.

11. In a signal lamp, a bracket having a shaft journaled thereon and a hinged extension for said shaft having a signaling device at its extremity, a lever pivotally connected with said shaft having a link connected with said extension, and means to hold the said shaft and extension in different set position.

12. In a signal lamp, a bracket and a short shaft journaled therein, a ratchet and detent for said shaft, a hinged extension for said shaft having a lamp with lettered sides and an end light, and a lever pivotally connected with said shaft having a link to swing said extension into different angular positions relatively to the shaft.

Signed at Cleveland, in the county of Cuyahoga, and State of Ohio, this 9th day of February, 1917.

ADDISON J. BENTZ.